United States Patent [19]

Hong et al.

[11] Patent Number: 4,961,139
[45] Date of Patent: Oct. 2, 1990

[54] DATA BASE MANAGEMENT SYSTEM FOR REAL-TIME APPLICATIONS

[75] Inventors: Le Thieu Hong, Fremont; Cynthia Givens; Ching Chao Liu, both of Sunnyvale; Michael J. Wright, Los Gatos; Feyzi Fatehi, Sunnyvale, all of Calif.

[73] Assignee: Hewlett-Packard Company, Palo Alto, Calif.

[21] Appl. No.: 213,578

[22] Filed: Jun. 30, 1988

[51] Int. Cl.[5] .................. G06F 15/40; G06F 12/00
[52] U.S. Cl. ........................... 364/200; 364/900; 364/282.1; 364/255.7; 364/242.4; 364/974; 364/949.3
[58] Field of Search ............................ 364/200, 900

[56] References Cited

U.S. PATENT DOCUMENTS

| | | | |
|---|---|---|---|
| 4,267,568 | 5/1981 | Dechant et al. | 364/200 |
| 4,376,297 | 3/1983 | Anderson et al. | 364/200 |
| 4,385,352 | 5/1983 | Bienvenu | 364/200 |
| 4,428,045 | 1/1984 | Davidian | 364/200 |
| 4,428,273 | 10/1983 | Plow | 364/200 |
| 4,546,432 | 10/1985 | Umemura et al. | 364/200 |
| 4,631,664 | 12/1986 | Bachman | 364/200 |
| 4,633,393 | 12/1986 | Rundell | 364/200 |
| 4,922,417 | 5/1990 | Churm et al. | 364/200 |

OTHER PUBLICATIONS

Database Design–Gio Wiederhold, pp. 126, 475, 476 and 613–621 Second Edition, 1983.

*Primary Examiner*—Michael R. Fleming
*Assistant Examiner*—Gopal C. Ray
*Attorney, Agent, or Firm*—James M. Williams

[57] ABSTRACT

A real-time database provides the predictable, high speed data access required for on-line applications, while providing flexible searching capabilities. The data retrieval routines include the option to "read-through-lock" to access data in locked data tables, the capability to directly access to data using tuple identifiers, and the capability to directly access unformatted data from input areas which contain blocks of unformatted data. The data updating routines include an option to omit index updating when updating data and an option to update data in a locked data table. Multiple indexes can be defined for a data table. Thus, high speed searches can be performed based on a variety of data fields. The data storage and retrieval mechanisms are independent and there are hash index tables that connect the multiple index keys to the data tables. The data table structure includes a column defined for storing tuple identifier strings. These tuple identifiers can be used as pointers for chaining to related data stored in other data tables. The datas base has relatively small programmatic memory. There is a common structure for user data tables, index tables and system tables. The database includes a minimum number of routines with certain routines providing multiple functionality.

3 Claims, 5 Drawing Sheets

DATA BASE MANAGEMENT SYSTEM FOR REAL-TIME APPLICATIONS

BACKGROUND

The invention relates to the structure of a real-time database, for example a database for computer integrated manufacturing systems.

A typical real-time system consists of two closely coupled subsystems, a controlled process and a controller. The controlled process could be, for example, automated manufacturing, weapon system control, or stock exchange transaction management. The controller is a computer which monitors the status of the controlled process and supplies appropriate commands.

In real-time systems, the supported applications have stringent timing constraints. Two critical parameters of real-time systems are response time and data measurement rate. Such systems cannot miss any data and they must respond to events that are asychronous and non-recurrent. Consequently, real-time systems must access data within predetermined time limits. Failure to access data within the limits can result in a loss of control over the process. In many cases, loss of control is not considered a degradation of performance; it is considered a failure.

In the context of computers, a "real-time" program is one which runs continuously, reacting spontaneously to changing inputs. For computer programs, the opposite of "real-time" is "batch" or "disk-based". Real-time programs are much more closely involved with their environments, which means the design and implementation of real-time programs must meet more stringent performance requirements.

Although conventional disk-based database systems provide efficient means for storing data and convenience features such as user-friendly interfaces, they rely on secondary storage to store the database. Transaction processing requires accessing data stored in the secondary storage, so transaction response time can be on the order of 30 milliseconds. Although this is fast enough for traditional applications involving a human user, it is not fast enough for real-time applications such as process control. Consequently, performance requirements and design issues for real-time database systems differ widely from those of conventional database systems, which do not have such severe constraints on response time. Disk-based database management software, whether it uses a hierarchical, network, or relational structure, cannot retrieve or even store data fast enough to meet the needs of many real-time applications.

A real-time database must be faster than a disk database, in many cases as much as 10 to 100 times faster. Also, a real-time database should have a special area for storing blocks of data, such as, recipes or unformatted data. There is a tradeoff between speed and features, and some capabilities generally found in a conventional database must be scaled down or omitted in a real-time database.

The most important performance criterion for a real-time database is response time. It must have a predictable, very fast data access rate. Accessing data at a very fast rate usually means that the data must be stored in memory rather than secondary storage. For multiple devices or processes to access the data it should be stored in shared memory. Access speed has a very high priority, but data integrity cannot be sacrificed in implementing data manipulation routines.

The search and data manipulation capabilities of the real-time database allow an application to access selected data in a timely and efficient fashion. Indexed searching contributes to high data access rates. Data access must be provided for configuration data, real-time process values, access codes, process recipe values, and other process-related information. Adding, deleting and modifying data on a real-time basis allows the application to organize the data and use the data in the most effective way.

Computer integrated manufacturing (CIM) demands a planned structure of on-line real-time data processing. This requires guaranteed access rates and performance protection so that an industrial process can continually be monitored and controlled. Guaranteed access rate means that no matter what the situation, any time-critical application can retrieve data within a certain very short time period, on the order of 10 to 100 microseconds.

Computer integrated manufacturing is fundamentally a shared database, so data management is an essential part of the system. The performance features of a real-time database are critical to the operation of the CIM system, and must serve varying needs at the workcell control level and the area management level of the CIM system.

The workcell control and area management levels are closely coupled. The area manager level places more emphasis on data management and analysis, but it may still have some special or real-time requirements of data. The area manager may need fast access to data for generation of trend charts, process reports, control of material reports, and communication with both higher level and lower level computer systems. The area manager might also transfer large blocks of data when transferring action recipes down to the workcell.

The workcell area has a more immediate effect on the control process. Therefore, it is typically involved with more real-time functions. Workcell level functions include supervision of programmable logic controllers (PLCs), loop controllers (LCs), and numerical controllers (NCs), data logging, alarm management, and process graphics.

Information usually originates on the workcell control level of the CIM model. It is that level that physically gathers most of the data used in the other levels. The variety of equipment in the workcell makes it important for the database to be able to consolidate the data in a unique and understandable format at very high rates. The workcell devices often require transfers of unformatted data at high rates. This requires the database to provide storage areas dedicated to large blocks of unstructured data.

Workcell applications performing monitoring and control functions must instantaneously store large amounts of data from devices, such as, PLC's, NC's, robots, and automatic-guided vehicles. Other applications at the workcell level might also require special storage of data for such things as local data control, manipulation and display, and local buffering and retrieval. Adding, deleting, modifying and organizing the data from each of these devices on a real-time basis defines the performance and functionality requirements for a real-time database at the workcell level.

While providing the above-described functionality, it is desirable for real-time databases to incorporate some of the characteristics of conventional disk-based databases. In particular, using a relational style, table based architecture has advantages. This allows easy transfer of data between the real-time database and traditional disc-based databases that perform functions such as off-line analysis of real-time data. Chaining data tables together to tie related data is another desirable feature. Providing search keys and indexes is also important. In a real-time database, the searching function should combine speed and flexibility as much as possible. Finally, data integrity is important and cannot be compromised by the data manipulation and access routines used to provide guaranteed response time Currently there are two dominant approaches to satisfying the need for a real-time database The first is to construct a custom memory resident data management facility Although this approach achieves the desired performance level it does not supply a tool that is generic or flexible The custom database is tied to a particular type of application. As a result, the custom implementation is difficult to modify with changing needs and it cannot be reused in other applications The other approach is to use the file system. This common solution has two major drawbacks. One is that the structure and access features are primitive and limited. The other is that the performance is lower than that available with a memory resident database. As performance requirements increase, the file base solution will become too slow.

SUMMARY OF THE INVENTION

The real-time database of the invention provides the predictable, high speed data access required for on-line applications, while providing flexible searching capabilities.

The data retrieval routines provide guaranteed response time and high speed data access The data retrieval routines include the option to "read-through-lock" to access data in locked data tables, the capability to directly access to data using tuple identifiers, and the capability to directly access unformatted data from input areas which contain blocks of unformatted data.

Second, the data updating routines provide data updating at high speed that does not impact the guaranteed response time. The data updating routines include an option to omit index updating when updating data and an option to "write-through-lock" to update data in a locked data table These features can significantly decrease the time required for updating data.

Third, the index hashing mechanism provides for high speed, flexible searching using index key values Multiple hash indexes can be defined on one data table. Thus, high speed searches can be performed based on a variety of different sets of data fields. The user data and hash indexes are stored independently. Hash index tables connect the multiple index keys to the data tables. Fourth, the tables can include a byte string type column for storing user defined data. This kind of column can also be used for storing tuple identifiers. These tuple identifiers can be used as pointers for chaining to related data stored in other data tables Related data can then be accessed without having to do a search on the other data tables.

Finally, the database of the invention provides relatively small code size This is achieved by using a common structure for user data tables, index tables and internal system tables. Also, many database routines share subroutines

DETAILED DESCRIPTION OF THE DRAWINGS

DETAILED DESCRIPTION OF THE INVENTION BASIC FRAMEWORK

The basic framework for a database based on a relational model is a set of data tables. The tables are arranged in columns and rows. The columns identify the main categories or attributes of data and their data types. The rows hold related data for all the categories involved. The collection of elements in a row is referred to as a tuple. Each row of related data entries in a table is uniquely identified by a tuple identifier, which includes the number of the table to which the tuple belongs and a tuple number identifying the tuple storage location.

Overall Database System Structure

Figure 1:
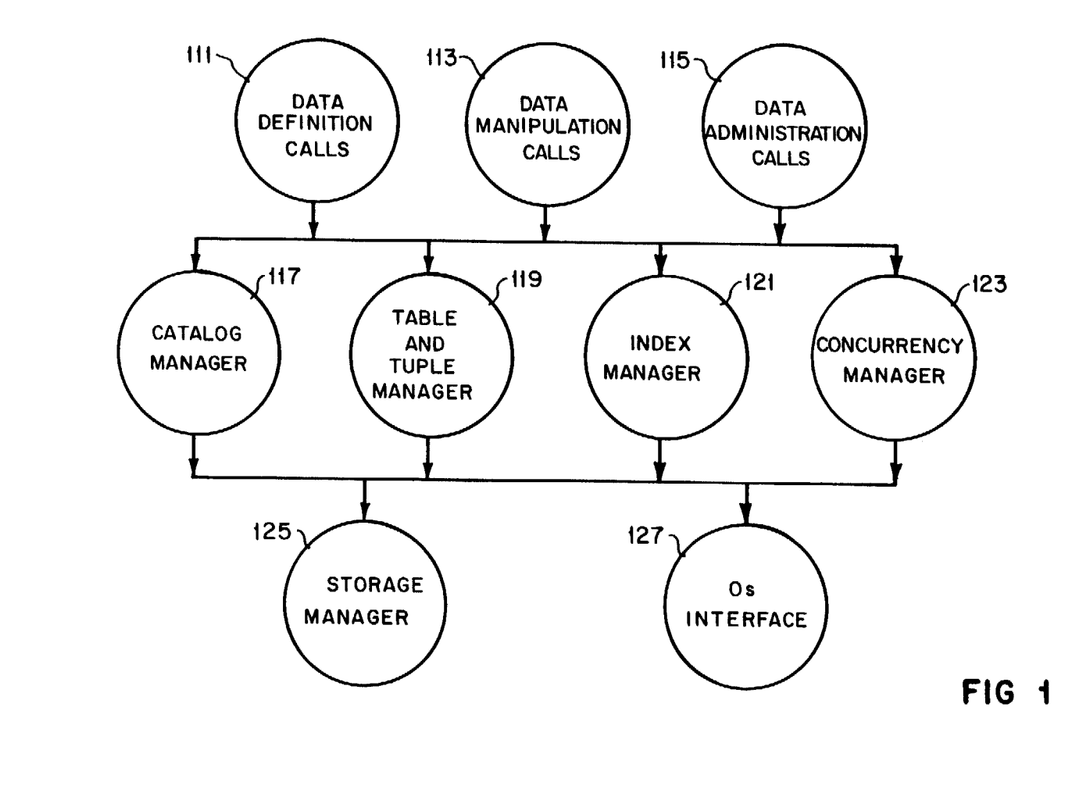
FIG. 1 illustrates the overall structure of the real-time database of the invention, with two levels of modules.

The overall structure of the real-time database of the invention is illustrated in FIG. 1 and can be envisioned as having two levels of modules. The high level modules include routines, grouped according to function, which are visible to the database users, i.e., they are called by the external application programs. The high level modules perform data definition calls 111, data manipulation calls 113, and data administration calls 115. The high level modules (user callable modules) and their routines are listed in Table 1. The low level modules are the catalog manager 117, table and tuple manager 119, index manager 121, concurrency manager 123, and storage manager 125. These modules comprise routines, called from the high level modules, which provide access to control blocks, the file system, user data, internal structures, and other elements. The low level modules and their routines are listed in Table 2. The high level routines share the low level routines in performing their functions. An operating system interface module 127 provides communication with the host computer operating system, for example, a UNIX based operating system.

The data administration calls, module 111, are routines for creating the schema for the database, building and rebuilding the database in memory, removing the database memory, and changing database passwords.

The data manipulation calls, module 113, are routines for opening a data table for access, retrieving a tuple from a data table, adding a tuple to a table, and updating or removing a tuple from a table. Retrieval can be done by a sequential search, by a hash index key search or by direct access using a tuple identifier. Data manipulation functions also include routines for opening the input areas for access, retrieving unformatted data from input areas, and storing data into input areas. Finally, the data manipulation calls can lock or unlock a table or an input area.

The data definition calls, module 115, are routines for defining a table, defining columns in a previous defined table, defining an index on columns of a defined table, defining an input area, and removing a table index or an input area.

The catalog manager, module 117, calls the other managers' routines to create and maintain the system catalog. All objects in the database are reflected in the system catalog, which is a set of system tables. The systems tables are generated automatically during the execution of the data base definition routine when the user creates the database. System tables have similar structure to user-defined tables, but they are maintained by the database for use as system directories for user-defined tables, columns, indexes and input areas.

The table and tuple manager, module 119, has routines to handle functions such as formatting a table block, adding a tuple, retrieving a tuple, updating a tuple, and deleting a tuple. The table and tuple manager routines are designed with performance as a top priority. Performance is considered most important in executing direct reads and writes. Sequential reads, adds and deletes are handled in descending priority. Most table and tuple manager routines are small and are implemented as C language macros to avoid the overhead of a call.

The index manager, module 121, has routines to handle hashing and functions related to performing the internal operations required to maintain the user defined indexes. Indexes can be defined by the user for the user data tables. In general, indexes are defined for tables in order to provide faster retrieval of the specific contents of each table.

The concurrency manager, module 123, includes routines for synchronizing concurrent accesses to the database so that database integrity and consistency are maintained. The mechanism used for synchronizing concurrent accesses to the data is a lock. Concurrent requests for locks are synchronized by semaphores.

The storage allocation manager, module 125, has routines to handle functions relating to keeping track of allocated and available memory storage. The database resides in shared memory, including fixed-sized blocks for internal system tables (which store database management information) and variable size blocks allocated to user defined tables, indexes and input areas. The storage allocation manager dynamically allocates storage to the tables, indexes and input areas, as required. When a request for storage for a table, an index or an input area is made by the user, the storage allocation manager scans the list of free blocks until a large enough block is found. If the block is the size requested, it is allocated to the request. If the block is too big, it is split and the proper amount is returned as allocated while the residue is put back onto the free list. If no big enough block is found, an error message is returned to the request.

Table Structure and Input Areas

Figure 2:
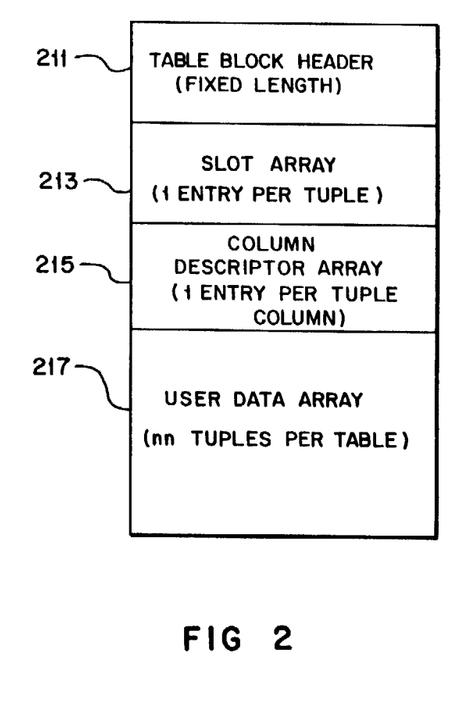
FIG. 2 shows the table block format of a database constructed according to the teachings of the invention.

All tables in the database of the invention have the same internal structure, whether they are data, index or system tables. Tables are stored in table blocks, which are comprised of control structures and data. FIG. 2 shows the table block format. It consists of a table block header 211, a slot array 213, a column descriptor array 215, and a user data array 217. The table block header 211 contains structural information for the table, including data offsets, capacities, etc. The slot array 213 indicates which tuples in the table are in use and which are free. The column descriptor array 215 indicates the type length and offset of the columns for each tuple. The user data array 217 contains the system or user data for the table.

The direct retrieval feature, using a tuple identifier, could result in data integrity problems, because with direct access there is no check on the actual data stored in the tuple. A process could access incorrect information if another process had deleted the tuple and added a new tuple which happened to be stored at the same storage location. The database of the invention overcomes this potential problem by including a version number associated with each tuple storage location in the table block. The version number and the tuple number uniquely identify a tuple of a table over time since the version number is incremented each time the tuple is deleted. The version number is also included in the tuple identifier, so when a process attempts a direct access using a tuple identifier and the tuple has been deleted, the tuple identifier will not match and the process will be notified.

Input areas are user-defined blocks of memory space reserved for unstructured data. Information arriving at the database at a fast rate can be stored in an input area. At the time the input area is opened for access, the physical address at the beginning of the block of the input area is returned, as well as the input area identifier. This enables the user to perform direct retrieval of data stored in the input area using the physical address or by giving an offset into the input area to the routine that retrieves data from the input area.

Indexes and Hashing

An index is a set of pointers to the tuples in a table. Indexes can be used for very quick access to tuples whose key values are already known. A key is the value of the column or columns of a tuple associated with an index. A key for an index is composed of one to five columns of a table, which are specified in a specific order when an index is defined for the table. Each table may have multiple indexes defined on it. Only one key can be associated with each index. A hash index accepts a key value as input and gives as output the tuple identifier of one tuple that contains that key value.

Figure 3:
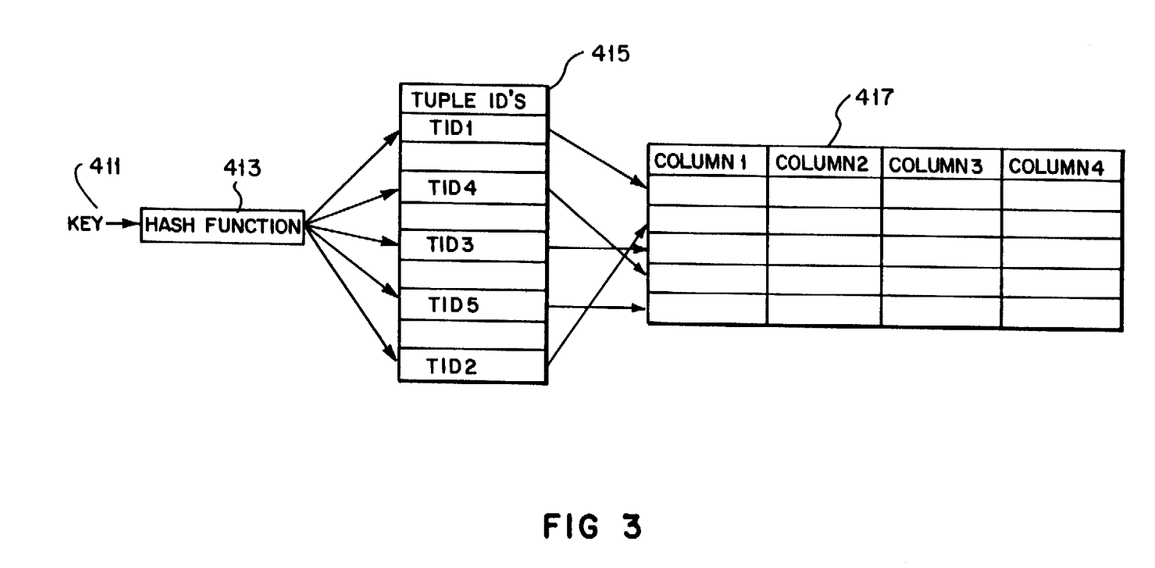
FIG. 3 illustrates the overall structural design for the hash indexes in the database of the invention.

FIG. 3 illustrates the overall structural design for the hash indexes in the database of the invention. Unlike the common practice, hashing is not used as a method for both storage and retrieval of the actual data, but only as a means for providing a very fast retrieval mechanism. Hashing a key value 411 with a hash function 413 does not directly access a data table 417. Access is through an intermediate table called a hash index 415. There is a hash index for each user defined index key on a data table.

The hash index 415 is a table of tuple identifiers (tid1, tid2, . . . ) for the tuples in the data table 417, arranged so that the hash index tuple numbers resulting from applying the hash function to a key value correspond to the hash index locations containing the tuple identifiers for data table tuples containing that key value.

Figure 4:
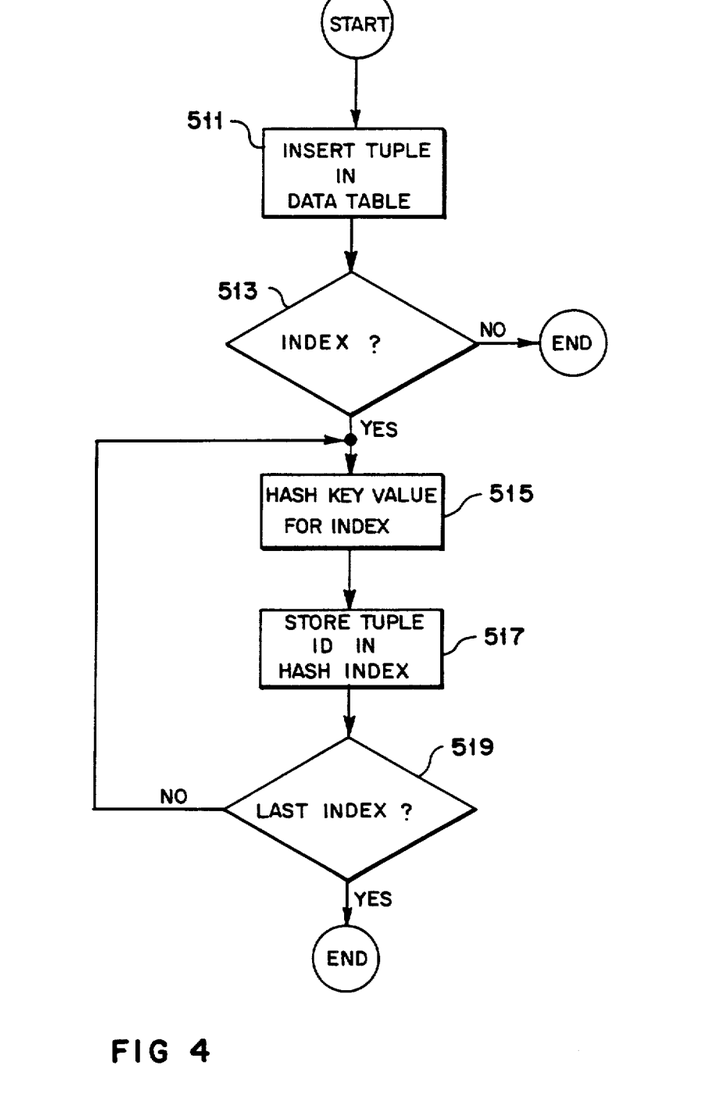
FIG. 4 is a flow diagram illustrating the data storage process of the database of the invention.

To store a tuple in a table on which an index is defined, the following steps are taken, as illustrated in the flow diagram in FIG. 4. The tuple is inserted in an available slot in the data table (block 511). Then, if the data table has an index (decision point 513), a location is found in the hash index table by applying the hash function to the key value defined for that index (block 515).

Finally, the tuple ID of the inserted tuple is stored in the hash index location resulting from the hash index function (block 517). If there are multiple indexes defined for the data table (decision point 519), the process is repeated for each index defined for the table.

This design provides major advantages for retrieval of data. First, each table can have more than one index defined for it. This is not possible if hashing is used directly for storage of data in data tables. Second, each hashed index can be rehashed without migrating the actual tuples. Therefore, the tuple identifiers will not change. This ensures that direct accessing will not necessitate recomputing tuple identifiers each time rehashing takes place, and significantly improves the performance of applications which involve frequent updating of the table columns that are defined as index keys. Third, unlike direct hashing algorithms, indexes can be defined or removed for already existing tables. Fourth, the space overhead incurred due to defining a hash index is a direct function of a number of tuples in a table and does not depend on the number of columns, so it does not increase as new columns are added to a table. In direct hashing algorithms, the space overhead is not only function of the number of tuples, but also it is a function of the number of columns, and it increases as new columns are added to a table.

Searching and Data Retrieval

The database of the invention supports three routines for retrieving tuples from data tables and one routine for retrieving byte sequences from input areas: MdGetTplDir, MdGetTplIx, MdGetTplSeq, and MdGetTplIA.

The three methods of retrieving tuples are direct retrieval, indexed or hashed retrieval, and sequential retrieval.

A sequential retrieval (MdGetTplSeq) is the often the slowest form. A sequential retrieval requires going through every tuple in a table one by one until the tuple or tuples that match the retrieval criteria are found. A sequential retrieval must be done to search on columns which are not part of an index. The method of indexing provides the flexibility to define multiple indexes for a table, and thus, perform more efficient searches based on various attributes of the data stored in the data table. Also, each index key can be defined on up to five columns.

Direct retrieval (MdGetTplDir) is the fastest form of data access. A tuple is retrieved directly by its tuple identifier. The tuple identifier can be obtained through a previous index or sequential retrieval operation or when adding the tuple, which returns the tuple identifier to the user application program. A hash index (MdGetTplIx) is a fast way to retrieve tuples when searching for tuples with specific column values. The column values are combined to form a key value and the database retrieves all tuples containing the specified key value one call at a time. A hash index accepts a key value and returns the tuple identifier and the tuple value of the tuples that contains the specified key value.

The database of the invention also provides the user direct access to input areas by using the physical address or by using an offset to retrieve the byte string from a defined input area. Access by physical address is possible because, when an input area is opened for access, the physical address for the input area is returned to the user. This type of access is the fastest way to access an input area. For better data integrity, a routine (MdGetTplIA) is provided to retrieve data from an input area given an offset into the input area and the input area identifier, which is returned to the user when the input area is opened for access.

Locks and Data Updating

As described above, in a computer integrated manufacturing environment there may be multiple applications trying to access the data concurrently. In order to maintain database integrity and synchronize the concurrent accesses, a lock is used.

Locking occurs when a process accesses a table or input area exclusively, making that table or input area inaccessible to other processes. When the process releases the table or input area, the lock is removed and the table or input area becomes accessible to other processes.

Locks can be applied either to data tables or to input areas. For each read and write database access, the database locks the accessed data table or input area implicitly. The implicit lock is automatically released at the end of the access. A lock can also be applied by an explicit user call (MdLock). Explicit locks are released only by the explicit unlock call or at the termination of a session. In real-time applications there are times when the application needs to access the database even if a data table is locked. For this reason, the update and retrieval routines have selectable parameters for read-through-lock and write-through-lock capability. A routine called with the read-through lock flag set can access a table or input area regardless of its lock status. In order to maintain data integrity only non-key fields can be updated using write-through-lock capability.

The update routine also includes a parameter which allows data updates without error checking or updating with regard to the indexes. In order to avoid corruption of indexes, the data updated using this option should include only data in columns that do not make up an index. Because this option, especially in conjunction with write-through-lock, significantly reduces the overhead involved in updating data, it should be used when possible to improve the performance of updates to tables.

Illustrative Example

Figure 5:
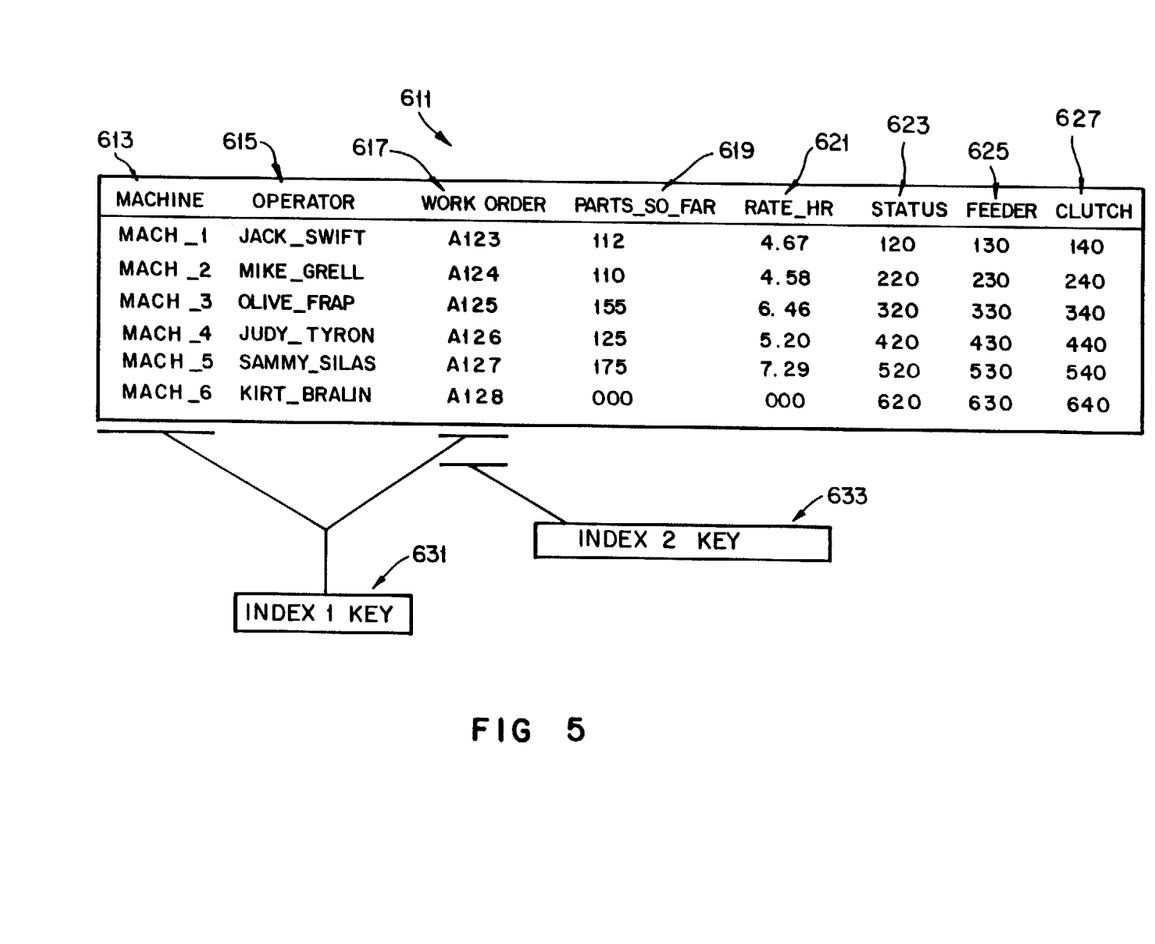
FIG. 5 shows a data table illustrating the application of the database of the invention to a simple workcell.

An example of a user defined data table that illustrates some of the functions of the database of the invention is shown in FIG. 5. This example concerns a data table 611 named "Machine—Table" for organizing and storing information related to a set of machines in a workcell. There are eight columns 613, 615, 617, 619, 621, 623, 625 and 627 stored in the table, with the following column names: machine, operator, work_order, parts_so_far, rate_hr, status, feeder, and clutch. There are six rows or tuples shown in the data table, one for each of the six machines in the workcell.

The machine column 613 and operator column 615 contain character string data that identifies the machine and the operator's name. The work order column 617 contains byte string data that identifies the work order in progress on the machine. The parts_so_far column 619 contains integer data giving the number of parts completed on the work order. The rate_hour column 621 contains floating point decimal data giving the production rate achieved on the current work order. The machine status column 623, feeder column 625 and clutch column 627 are used to find out if the machine is on or off, if there is a feeder jam and if the clutch is engaged. This information is received as unformatted data from the machine controllers and stored in an input area. The data table entries give the byte offsets for pointers to the location of the data in the input area.

To continue the example, a user might define two indexes for the machine data table. The first index uses the values in both the machine and work order columns for its key 631. This combination should provide a unique key to uniquely identify a tuple in a table. The second index uses the values in the work order column for its key 633. This key could be a non-unique key if one work order can be assigned to more than one machine. Note that two indexes are defined on the same data table. Each index will have a hash index table whose entries comprise the results of hashing the values of that index's key.

With these two indexes defined, the user might decide to update the parts_so_far data values with a routine flag set not to update the indexes. This is acceptable because the parts_so_far column 619 is not included in the key for either of the indexes.

A user could define another data table, to be used in conjunction with this machine table, to organize and store information concerning work orders to be processed by the six machines in the workcell.

TABLE I

User Callable Modules.

Administrative Functions

| | |
|---|---|
| MdDefDb | create schema file, set/change database limits |
| MdBuildDb | build/rebuild the database in memory |
| MdRmDb | remove the database from memory |
| MdChgPwd | change datbase passwords |

Data Definition Functions

| | |
|---|---|
| MdDefTbl | define a table |
| MdDefCol | define a column in a previously defined table |
| MdDefIx | define an index on column(s) of a defined table |
| MdDefIA | define an input area |
| MdRmTbl | remove a table |
| MdRmIx | remove an index from a table |
| MdRmIA | remove an input area |

Session Begin/End Functions

| | |
|---|---|
| MdOpenDb | open the database, initiate a session |
| MdCloseDb | close the database, terminate a session |

Data Manipulation Functions

| | |
|---|---|
| MdOpenTbl | open a table for access |
| MdGetTplSeq | get a tuple by sequential search |
| MdGetTplIx | get a tuple by hash index key |
| MdGetTplDir | get a tuple directly using its tuple identifier |
| MdPutTpl | add a tuple to a table |
| MdUpdTpl | update a tuple given its tuple identifier |
| MdRmTpl | remove a tuple given its tuple identifier |
| MdOpenIA | open an input area for access |
| MdGetIA | get a value from an input area |
| MdPutIA | store a value into an input area |
| MdLock | lock a table or an input area |
| MdUnlock | unlock a table or an input area |

Utility Functions

| | |
|---|---|
| MdTakeImage | save an image of the current schema in memory to disc |
| MdCleanup | reclaim resources held by prematurely terminating processes |
| MdColInfo | give information on a column of a table |
| MdDbSzInfo | give the minimum storage size of the defined data base |
| MdIxInfo | give information on an index defined on a table |

TABLE II

Low Level Modules.

Catalog Manager Functions:

| | |
|---|---|
| MdGetColNum | get a list of column numbers given column names |
| MdGetColTid | get the tid of tuple in the column system table with specified column name |
| MdGetColTpl | get address of a tuple in the column system table |
| MdGetIATpl | get address of a tuple in the input area system table |
| MdGetIxTid | get the tid of tuple in the index system table with specified index name |
| MdGetIxTpl | get address of a tuple in the index system table |
| MdGetTblBlkH | get the address of the first block of a table |
| MdGetTblTpl | get address of a tuple in the table system table |

Table and Tuple Manager Functions:

| | |
|---|---|
| MdActNumTpl | return the current number of tuples stored in a table |
| MdAddSlotTpl | add a tuple to a table at the specified slot |
| MdAddTpl | add a tuple to a table |
| MdCalcTblSz | calculate the space needed for a table block |
| MdCalcTplLen | calculate the space needed to store a tuple |
| MdChkTplBlk | check that tuple belongs to a given table block |
| MdDelTpl | delete a tuple from a table |
| MdGetColDesc | get the address of the column descriptor array |
| MdGetNxtTid | get the next tuple in the table |
| MdGetSlot | get the address of a slot |
| MdGetTplInfo | get addresses of a table block, a tuple, and a version number |
| MdGetTplVsn | get the tuple address and the version number address |
| MdInitTblBlk | initialize a table block |
| MdRdTpl | read a tuple |

TABLE II-continued
Low Level Modules.

| | |
|---|---|
| MdRdTplCol | read columns of a tuple |
| MdUndoDel | add back a tuple just deleted |
| MdWrtTpl | write to a tuple |
| MdWrtTplCol | write to columns of a tuple |
| Index Manager Functions: | |
| MdAddIx | add a single index entry for a new tuple |
| MdAddIxTpl | add index entries for a new tuple |
| MdCalcIxSz | calculate the size needed for an index |
| MdCompKey | compare a supplied key with the corresponding key columns in a tuple |
| MdDelIx | delete a single index entry of a tuple |
| MdDelIxTpl | delete index entries of a tuple |
| MdGetColDef | get the address of a tuple in the column system table by hashing |
| MdGetIxDef | get the address of a tuple in the index system table by hashing |
| MdGetKeyInfo | return information on the key columns defined for an index |
| MdGetTblDef | get the address of a tuple in the table system table by hashing |
| MdGetTplHash | find a tuple using a hash index |
| MdHash | apply the hash function to a key value |
| MdInitIxBlk | initialize a hash index block |
| MdIxTplAddr | get the address of a tuple in an index block |
| Concurrency Manager Functions: | |
| MdAllcSess | allocate a session for database accessing |
| MdCalcCtlSz | calculate total space needed for the control blocks |
| MdCleanup | clean up the database state |
| MdInitLkCtl | initialize the control structures |
| MdLk | lock an object |
| MdUnLk | unlock an object |
| Storage Manager Functions: | |
| MdAllcStg | allocate the requested storage in shared memory |
| MdInitStg | initialize the storage control structures |
| MdRlseStg | release the specified storage |
| HP-UX Interface Functions: | |
| MdAllcSem | allocate a semaphore |
| MdAttchShM | attach the calling process to a shared memory segment |
| MdCloseFile | close a file |
| MdCrtShM | create a shared memory segment |
| MdDetchShM | detach the calling process from a shared memory segment |
| MdFreeSem | deallocate a semaphore |
| MdGetSem | get a semaphore |
| MdLkFile | lock a file |
| MdOpenFile | open a file |
| MdRdFile | read from a file |
| MdRlseSem | release a semaphore |
| MdRmShM | remove a shared memory segment |
| MdUnLkFile | unlock a file |
| MdWrtFile | write to a file |
| Miscellaneous Functions: (security, dba, etc.) | |
| MdChkDbAcc | check the database accessibility |
| MdChkDbMode | check and set single-user mode |
| MdCrtMDbStg | create shared memory for database control structures and system tables |
| MdEncrypt | encrypt a password |
| MdGetCfgFile | get the name of the database configuration file |
| MdGetFileId | get a file id |
| MdGetShMAddr | get the shared memory address |
| MdNameToKey | generate a pseudo-random integer value from a database name |
| MdParse | break a character string into multiple elements |
| MdPutImage | write an image of the database to the dbconfiguration file |
| MdUndFileId | update a file id |

We claim:

1. A data base management system for controlling storage, retrieval and modification of information in a data collection contained in storage devices in a data processing system, said data collection comprising a plurality of data records stored as tuples in data tables, and unformatted data stored in input areas, comprising:

(a) mans for defining an index on a data table by specifying the selected ones of the tuple entries of the data table that comprise the key value for the index;

(b) hash index table means for storing tuple identifiers arranged so that the hash index tuple numbers resulting from applying a hashing function to a given key value for an index correspond to the hash index table locations containing the tuple identifiers associated with data table locations containing data with the given key value;

(c) first data storage means for storing data as tuples in data tables, with each tuple in a location associated with a tuple identifier uniquely identifying the tuple, comprising:

(i) means for inserting a data tuple to be stored in an available location in the data table, the location having a first tuple identifier;

(ii) means for applying a hashing function to the key value for the index, to determine a hash index tuple number corresponding to a location in a hash index table; and (iii) means for storing the firs tuple identifier in the hash index table location corresponding to the determined hash index tuple number;

(iv) means for outputting the tuple identifier corresponding to the location in the data table where the data tuple was stored;

(d) second data storage means for storing unformatted data in blocks of memory space defined as input areas, and for outputting an input area identifier and the physical address of the stored unformatted data;

(e) first data retrieval means for providing indirect access to data in a data table on the basis of a key value, comprising:
  (i) means for applying a hashing function to the key value to determine the location of a tuple identifier in a hash index table; and
  (ii) means for retrieving the data from the location associated with the tuple identifier in the data table;

(f) second data retrieval means for providing direct access to data in a data tale on the basis of a tuple identifier, comprising means for retrieving the data from the location associated with the tuple identifier in the data table;

(g) third data retrieval means for providing direct access unformatted data from input areas, comprising means for retrieving unformatted data using a physical address for the data, and means for retrieving data using an input area identifier and an offset value; and (h) data modification means for updating data in the data table, comprising means for selectively updating the hash index table or not updating the hash index table when modifying data in an indexed data table.

2. The data base management system according to claim 1, further comprising:

means for locking the data in a data table to indicate that the data should not be accessed or updated;

wherein said first data retrieval means further comprises means for selectively accessing data in locked data tables; and wherein said data modification means further comprises means for selectively updating data in locked data tables.

3. A method for storing and retrieving data tuples in data tables in a database so that more than one index can be defined for a data table, each location in the data table associated with a unique tuple identifier, the method for storing comprising the steps of:

(a) defining at least one index on a data table by specifying the entries of the data table that comprise the key value for the index;

(b) inserting a data tuple to be stored in an available location in the data table;

(c) applying a hashing function to the key value for the index, to determine a hash index tuple number corresponding to a location in a hash index table; and (d) storing the first tuple identifier in the hash index table location corresponding to the determined hash index tuple number;

(e) repeating steps b. through d. above for each index defined on the data table; and (f) outputting the tuple identifier corresponding to the location in the data table where the data tuple was stored; and the method for retrieving data tuples comprising the steps of:

(a) applying a hashing function to the key value to determine a tuple identifier for a location in a hash index table;

(b) retrieving the tuple identifier from the location in the hash index table; and (c) retrieving the data tuple from the location in the data table associated with the tuple identifier retrieved from the hash table.

* * * * *